United States Patent [19]

Yoshikawa et al.

[11] 3,760,221

[45] Sept. 18, 1973

[54] DEFLECTION AND PICTURE POSITION ADJUSTING APPARATUS

[75] Inventors: Sadayoshi Yoshikawa; Mitsuo Arita, both of Osaka, Japan

[73] Assignee: New Nippon Electric Company Ltd., Osaka, Japan

[22] Filed: Oct. 19, 1970

[21] Appl. No.: 81,870

[30] Foreign Application Priority Data

Nov. 29, 1969 Japan .............................. 44/95940
Nov. 29, 1969 Japan .............................. 44/95941

[52] U.S. Cl. ........... 315/27 TD, 315/27 GD, 317/29
[51] Int. Cl. ............................................ H01j 29/70
[58] Field of Search .................. 315/27 TD, 27 GD, 315/29

[56] References Cited

UNITED STATES PATENTS

| | | | |
|---|---|---|---|
| 3,241,044 | 3/1966 | Mills | 315/27 TD |
| 3,609,219 | 9/1971 | Diehl | 315/27 TD X |
| 3,648,099 | 3/1972 | Otten et al. | 315/27 TD X |

OTHER PUBLICATIONS

Compensating for Two Types of CRT Distortion, Electronic Design, May 11, 1964, pp. 62–64.

*Primary Examiner*—Carl D. Quarforth
*Assistant Examiner*—P. A. Nelson
*Attorney*—Posnack, Roberts & Cohen

[57] ABSTRACT

Vertical deflection and picture position adjusting circuits are provided for color television receivers. These circuits include a vertical output transformer having a primary winding to which is supplied a sawtooth wave from a vertical output element, and a secondary winding for supplying vertical deflection current to a vertical deflection coil. Feedback is provided from a circuit including the deflection coil and secondary winding to the vertical driver stage connected thereto for the purpose of compensating linearity. A vertical deflection and picture position adjustment arrangement provides that the primary winding and secondary winding are isolated from each other in a DC sense. Also current is supplied to the vertical output element from a first DC source. In a first type of circuit of the invention, a first loop circuit is formed by said secondary winding, the vertical deflection coil, a feedback resistor associated with the vertical deflection coil, a feedback resistor associated with the vertical driver stage, and a capacitor which passes the vertical deflection current. A second loop circuit is formed by said secondary winding, said vertical deflection coil, a choke coil for blocking vertical deflection current and a variable resistor. The brush of the variable resistor is connected to a second DC source, and load circuits are connected to the respective terminals of said variable resistor in a DC sense or alternatively a switchable load circuit is connected selectively to said variable resistor. A third DC source is provided for supplying DC current to said vertical driver stage via said feedback resistor. Current feedback is supplied to said driver stage through said feedback resistor when vertical deflection current flows through said first loop circuit. The value and direction of the DC current which will flow in the vertical deflection coil when DC current is supplied to said load circuit(s) from said second DC source by way of said second loop circuit are determined by said variable resistor whereby the picture position is adjusted. In a second type of circuit of the invention, a series circuit is formed by said secondary winding and vertical deflection coil and an AC loop circuit is formed by said series circuit and a feedback resistor associated with the vertical driver stage and a capacitor. One terminal of said series circuit is connected to a second DC source via a DC current shunting circuit. The secondary winding is connected via a DC current shunt-ing, variable resistor to a third DC source whose potential is higher than that of said second DC source. DC current is supplied to said vertical driver stage from said second DC source through said feedback resistor. Current feedback is effected to said driver stage by using said feedback resistor when vertical deflection current flows through said AC loop circuit. The value and direction of the DC current flowing in the vertical deflection coil are determined by said variable resistor. Unidirectional conductive elements are connected between said second and third DC sources and form a stabilizing circuit for keeping the voltage ratio between the two DC sources constant.

20 Claims, 9 Drawing Figures

PATENTED SEP 18 1973

3,760,221

INVENTORS
SADAYOSHI YOSHIKAWA
MITSUO ARITA
BY
Posnack, Roberts & Cohen
ATTORNEYS INVENTORS
SADAYOSHI YOSHIKAWA
MITSUO ARITA
BY
Posnack, Roberts & Cohen
ATTORNEYS INVENTORS
SADAYOSHI YOSHIKAWA
MITSUO ARITA
BY
Posnack, Roberts & Cohen
ATTORNEYS INVENTORS
SADAYOSHI YOSHIKAWA
MITSUO ARITA
BY
Posnack, Roberts + Cohen
ATTORNEYS INVENTORS
SADAYOSHI YOSHIKAWA
MITSUO ARITA
BY
Posnack, Roberts & Cohen
ATTORNEYS INVENTORS
SADAYOSHI YOSHIKAWA
MITSUO ARITA
BY
Posnack, Roberts & Cohen
ATTORNEYS

DEFLECTION AND PICTURE POSITION ADJUSTING APPARATUS

BACKGROUND

1. Field of Invention

This invention relates to vertical picture position adjusting circuits and more particularly to such circuits for use in color television receivers and especially transistorized color television receivers.

It is an object of the invention to provide for improving vertical linearity by the feeding back of vertical deflection current to a driver stage.

2. Prior Art

In the manufacture of a television receiver, it is very difficult to set the electron gun in position accurately at the correct angle and, in many television receivers, the electron gun is often found to be out of position in the picture tube.

In a television receiver in which the gun is out of proper alignment, electron beam scanning is considerably shifted and, as a result, a picture is produced in deviated position on the associated screen or else part of the picture is cut off at the edge of the screen. This is why adjustment is provided to bring the picture accurately into position on the screen.

Generally, in black and white television receivers, a centering magnet is provided outside of the picture tube in order to enable adjusting the angle at which the electron beam, when deflected by the deflection coil, is brought into the deflection region. In color television receivers, however, an adjustment using a centering magnet would disturb other necessary adjustments which are correlated with each other in connection with the arrangement of fluorescent bodies producing the three colors and for directing the electron beam for properly striking these fluorescent bodies.

In vacuum-tube-type color television receivers, a bifilar coil is provided for the vertical output transformer which is conventionally employed, and DC current is supplied to the deflection coil. This DC current is superimposed on the deflection current and, by changing the direction and value of the DC current, the picture position is adjusted. In transistorized color television receivers, a capacitor having a large capacity is connected in series with the vertical deflection coil and vertical deflection current is fed back to the vertical driver stage. In this type of color television set, it is impossible to apply the aforesaid picture position adjusting method which has been employed for the vacuum-tube-type color television receiver.

SUMMARY OF INVENTION

This invention eliminates the above-described shortcomings of the prior art and provides a structurally simple and economical circuit comprising, according to a first group of embodiments, a first loop circuit for vertical deflection current and a second loop circuit for DC current to provide compensation of linearity and adjustment of the picture position. According to the invention, it is also readily possible to supply the driver stage with feedback in the circuit arrangement to be described.

Generally, there is provided in accordance with the invention, vertical deflection and picture positioning adjusting apparatus for use with a picture tube. This apparatus comprises means for generating a sawtooth wave, which means includes driver and output stages connected together in operative association and in feedback relation. The apparatus further includes a transformer with a primary winding connected to said output stage and a secondary winding inductively coupled with the primary winding. A vertical deflection coil is also included which is coupled to the secondary winding and which is positioned in operative association with the aforesaid picture tube. A source of direct current is coupled to the secondary winding and deflection coil and a control means is provided which controls the magnitude of the direct current as well as the direction of the same through the deflection coil whereby there is enabled an adjustment of the vertical position of a picture on the picture tube.

The aforesaid stages are preferably transistor circuits and a DC voltage source is connected through the primary winding to the aforenoted output stage. A resistor connects the secondary winding and deflection coil in feedback relation with the circuit of the driving station for linearity compensation. Still a further DC source is connected via the latter said resistor to the circuit of the driving stage and the source of direct current is at a potential which is greater than the potential of said further DC source.

In one group of embodiments of the invention, the aforesaid control means includes a variable resistor connected in a loop with the secondary winding and deflection coil. A capacitor may be coupled in parallel across said variable resistor to bypass deflection current. Another capacitor may be connected in said loop with said secondary winding and deflection coil with a resistor being connected between said further DC source and the resistor which connects the latter said source to the circuit of the driving stage.

Moreover, at least one load may be connected to the above noted variable resistor which includes a brush dividing the variable resistor into two sections and connected to said source of direct current. Where one load is employed, a switch can be provided for selectively connecting the load to the variable resistor. Alternatively, separate loads can be connected to opposite extremities of the variable resistor.

According to another group of embodiments, unidirectional conductive means are employed to couple the source of direct current to said further DC source, the unidirectional conductive means providing for a fixed relationship between the potentials of the said source of direct current and the said further DC source. The unidirectional conductive means will preferably consist of a serial arrangement of diodes having a predetermined forward voltage drop thereacross.

In this latter group of embodiments, a variable resistor can be coupled in or to a loop including the secondary winding and deflection coil and a bleeder resistor will be provided attached to the loop to enable the flow of direct current through the deflection coil since this would otherwise be prevented by the inclusion of a capacitor in the loop.

The above and other features of the invention will be found in the detailed description which follows with reference to the accompanying drawing.

DETAILED DESCRIPTION

Figure 1:
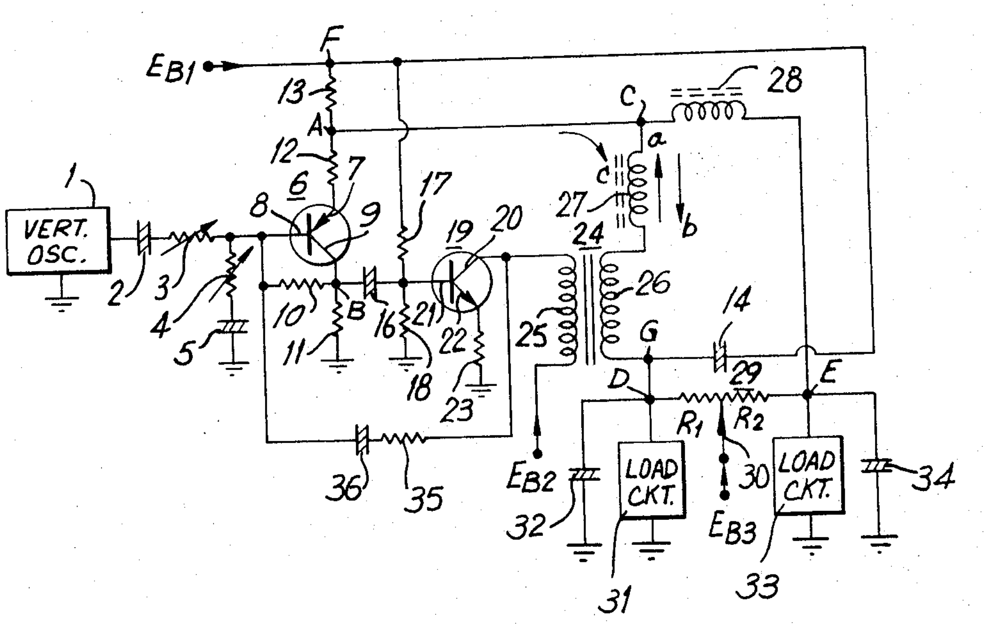
FIG. 1 is a schematic diagram of a circuit provided in accordance with one embodiment of this invention.

In FIG. 1, circuit 1 is a conventional vertical oscillator circuit. Its output terminal is connected to the base electrode 8 of vertical driving transistor 6 through a series circuit comprising a coupling capacitor 2 and a variable resistor 3 which is used for vertical amplitude adjustment.

A linearity adjusting circuit comprising a variable resistor 4 and a capacitor 5 in series (forming an integrator circuit) is connected between the base electrode 8 and ground. The collector electrode 9 of transistor 6 is connected to the base electrode 21 of vertical output transistor 19 through a coupling capacitor 16.

The emitter electrode 7 of vertical driving transistor 6 is connected to a positive DC source $E_{B1}$ via a series circuit consisting of resistors 12 and 13. Biasing resistors 17 and 18 are connected to the base electrode 21 of vertical output transistor 19.

One end of the resistor 17 is connected to the power source $E_{B1}$ and one end of the resistor 18 is connected to the ground. The emitter electrode 22 of transistor 19 is grounded via resistor 23. Its collector electrode 20 is connected to a positive DC source $E_{B2}$ via the primary winding of a vertical output transformer 24 whereby the collector electrode 20 receives DC current. The collector electrode 20 is furthermore connected to the base electrode 8 of the driving transistor 6 by way of a series circuit comprising a resistor 35 and a capacitor 36 thus forming a positive feedback circuit.

The upper terminal of the secondary winding 26 of the vertical output transformer 24 is connected to the junction A between the emitter resistors 12 and 13 of the driving transistor 6 through vertical deflection coil 27. The upper terminal of the vertical deflection coil 27 is connected to the lower terminal of the secondary winding 26 of the vertical output transformer 24 by way of the choke coil 28, which is used for preventing the vertical deflection current from being shunted and also by way of the position adjusting variable resistor 29.

The brush 30 of resistor 29 is connected to the positive DC source $E_{B3}$. $R_1$ and $R_2$ denote respectively two resistances selected by movement of the brush 30 along the position adjusting variable resistor 29. Load circuits 31 and 33 for supplying DC current are connected to ends D and E of the variable resistor 29. These load circuits may be resistance circuits or circuits otherwise included in the television receiver. The terminals D and E are grounded through the bypass capacitors 32 and 34 to prevent the vertical deflection current from flowing into the load circuits 31 and 33.

The lower terminal G of secondary winding 26 of the vertical output transformer is connected to junction F between the power source $E_{B1}$ and resistor 13 through capacitor 14 which bypasses the vertical deflection current.

The operation of the vertical deflection circuit of FIG. 1 will next be explained below. A 60Hz sawtooth wave generated by the oscillator circuit 1 is supplied to the base electrode 8 of the driving transistor 6 via the coupling capacitor 2 and amplitude adjusting variable resistor 3. In this operation, the integrator circuit consisting of variable resistor 4 and capacitor 5 (this integrator circuit is included in the base circuit) is operated to adjust the linearity of the upper portion on the screen.

The output of the transistor 6 is taken from terminal B of the collector load resistor 11 and is supplied to the base electrode 21 of vertical output transistor 19 via capacitor 16. The emitter electrode 22 of vertical output transistor 19 is provided with an isolating emitter resistor 23 for compensating linearity.

The sawtooth wave appearing at the collector electrode 20 of the vertical output transistor 19 is positively fed back to the base electrode 8 of the driving transistor 6 via the resistor 35 and capacitor 36 whereby linearity is compensated.

A sawtooth wave is fed to the primary winding 25 of the vertical output transformer 24. The vertical deflection coil 27 acts to feed back the deflection current to the junction A between emitter resistors 12 and 13 of the driving transistor 6 of the pervious stage whereby the linearity is compensated. The purpose of the choke coil 28 is to prevent the vertical deflection current from being shunted to the load circuit 33 so as not to cause the linearity to deteriorate. This choke coil has a high impedance with respect to the vertical deflection frequency.

Through the above arrangement, the deflection current is not shunted to the choke coil 28 but instead flows through a loop circuit comprising the secondary winding 26, vertical deflection coil 27, junctions C and A, emitter feedback resistor 13, junction F, bypass capacitor 14 and junction G. Hence no problem arises with respect to the vertical deflection circuit as would with the prior art.

The operation of the position adjusting portion of the circuit of FIG. 1 will next be explained. In this part of the circuit, the voltage of power source $E_{B3}$ exceeds, for example, by 2 to 3 volts, that of $E_{B1}$ so as to prevent current flow from the power source $E_{B1}$ to the deflection coil. When the brush 30 is brought nearer to junction D, the value of resistance $R_1$ becomes smaller than the sum of resistance $R_2$ and resistances of secondary winding 26, vertical deflection coil 27 and choke coil 28. As a result, most of the DC current from the power source $E_{B3}$ is supplied to the load circuit 31 through brush 30, resistance $R_1$ and junction D in this order. In this case, the value of resistance $R_2$ is larger than the sum of the resistance $R_1$ and the resistances of secondary winding 26, vertical deflection coil 27 and choke coil 28, and some of said DC current is shunted from junction D and is supplied to the load circuit 33 through junction G, secondary winding 26, vertical deflection coil 27, junction C, choke coil 28 and junction E in this order. As a result, a DC current flows in the vertical deflection coil 27 in the direction indicated by arrow "*a*" and is superimposed on the vertical deflection current. Thus the picture is entirely moved upward.

When the brush 30 is brought nearer to the junction E, the value of resistance $R_2$ becomes smaller than the sum of resistance $R_1$ and resistances of the secondary winding 26, vertical deflection coil 27 and choke coil 28. As a result, most of the DC current from the power source $E_{B3}$ flows to the load circuit 33 through brush 30, resistance $R_2$ and junction E. At this time, the value of resistance $R_1$ is larger than the sum of resistance $R_2$ and the resistances of choke coil 28, vertical deflection coil 27 and secondary winding 26. As a result, some of said DC current is shunted from the junction E and supplied to the load circuit 31 through the choke coil 28, junction C, vertical deflection coil 27, secondary winding 26, and junctions G and D in this order. Accordingly, a DC current flows through the vertical deflection coil 27 in the direction of arrow "*b*" and this current is added to the vertical deflection current. Thus, the picture is in entirety shifted downward.

In the embodiment of FIG. 1, the vertical deflection current is fed back directly to the driver stage whereby a desirable vertical linearity is obtained. Power sources having different voltages are used and thus picture position is adjusted without affecting vertical deflection. According to this embodiment, the first loop circuit for vertical deflection current consists of secondary winding 26, vertical deflection coil 27, emitter feedback resistor 13 of the driver stage, and bypass capacitor 14. The second loop circuit for DC current consists of secondary winding 26, vertical deflection coil 27, choke coil 28 and variable resistor 29.

As described above, relative to FIG. 1, the voltage of the power source $E_{B3}$ is higher than that of $E_{B1}$ by a few volts. If the voltage of $E_{B1}$ were to be higher than that of $E_{B3}$, the DC current from the power source $E_{B1}$ would be cancelled by that from $E_{B3}$ or would flow only in the direction of arrow "*c*." As a result, the picture could only be moved in one direction from a certain point regardless of the direction in which the brush 30 is moved. In other words, the picture cannot under such conditions be moved in both directions and it is impossible to realize perfect picture position adjustment.

Figure 2:
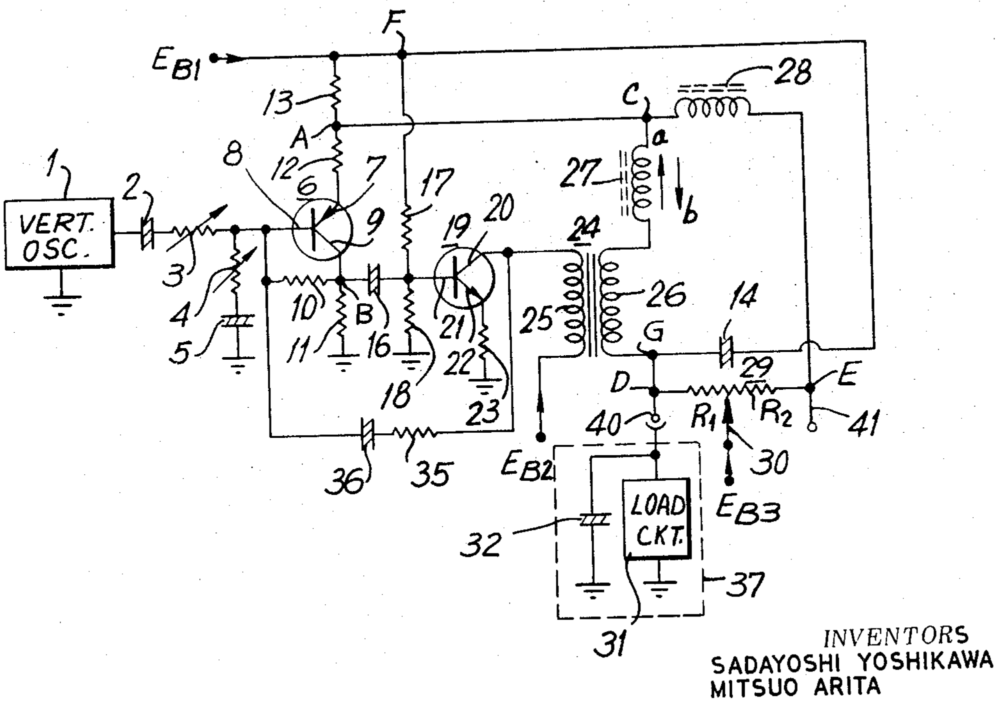
FIG. 2 is a schematic diagram of another embodiment of the invention.

FIG. 2 shows another embodiment of the invention wherein only one of the load circuits of FIG. 1 is used. In this embodiment, one load circuit unit 37 is provided and it is connected to the remainder of the circuit selectively through one of the terminals 40 or 41 by switching according to the desired direction of deviation of the picture.

More specifically, when it is desired to have the DC current flow in the direction of arrow *b*, the load circuit unit 37 is connected to terminal 40. When it is desired that the DC current flow in the direction of arrow *a*, the load circuit unit 37 is connected to terminal 41. In this embodiment, load circuit unit 37 can be interlocked with the resistor 29 for switching.

Figure 3:
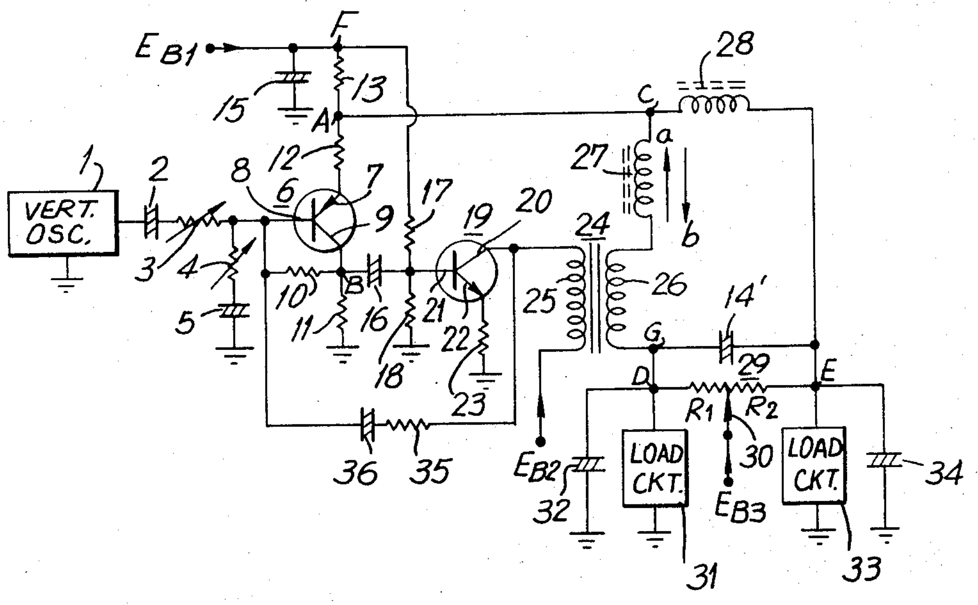
FIG. 3 is a schematic diagram of a third embodiment.

FIG. 3 shows another embodiment of the invention wherein, instead of capacitor 14 of FIG. 1, a capacitor 15 is connected between junction F and ground and a bypass capacitor 14' is connected in parallel with variable resistor 29.

In this embodiment, the first loop circuit for vertical deflection current consists of secondary winding 26, vertical deflection coil 27, capacitor 15, capacitor 32 or 34, and capacitor 14'. Similar to the arrangement in FIGS. 1 and 2, the voltage of power source $E_{B3}$ is higher than that of $E_{B1}$ by a few volts according to this embodiment.

Figure 4:
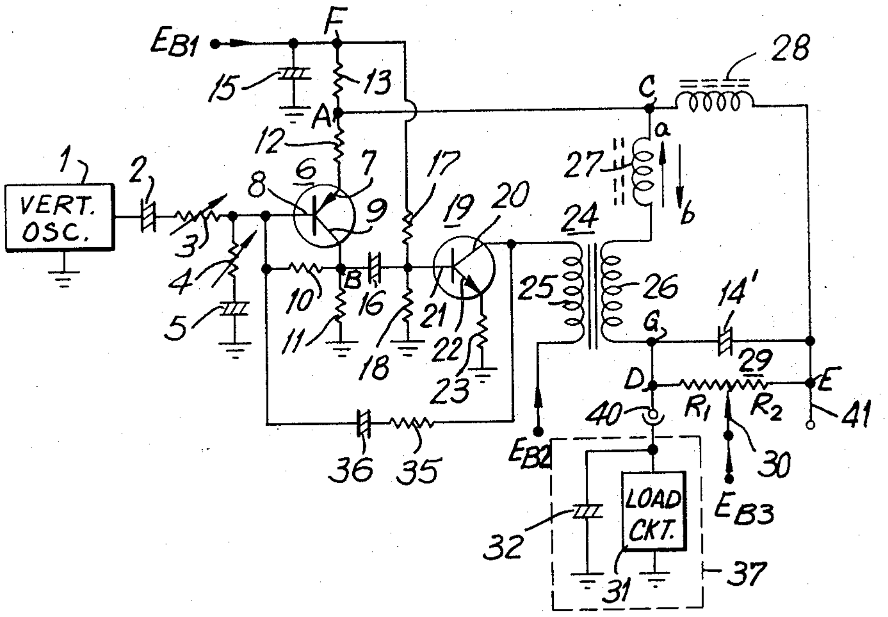
FIG. 4 is a schematic diagram of yet a further embodiment.

FIG. 4 shows still another embodiment of this invention wherein, instead of the load circuit of FIG. 3, a single load unit 37 is used with switching in the same manner as in FIG. 2.

Figure 5:
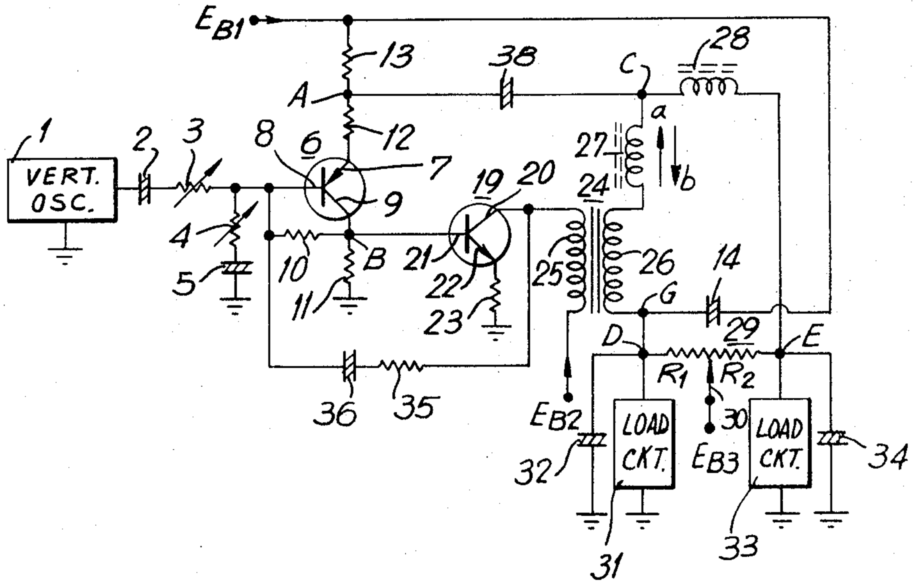
FIG. 5 illustrates another embodiment of the invention.

FIG. 5 shows a further embodiment of the invention. According to this embodiment, a DC blocking capacitor 38 of low peak voltage rating is connected between junctions A and C to prevent any undesirable influence from being exerted upon the vertical linearity due to variation of the bias of the output stage when the emitter current of the driver stage is varied by the picture position adjusting DC current. By virtue of this arrangement, it is possible to adjust the picture position without causing undesirable influence upon the vertical linearity whether the picture position adjusting power source $E_{B3}$ has a potential equal to or lower or even higher than that of the power source $E_{B1}$. If the power source $E_{B3}$ is at the same potential as $E_{B1}$, a common power source can be used and thus the circuit can be simplified. Thus, it is seen that the first loop circuit of this embodiment is provided with a capacitor 38 which is an element added to the circuits of FIGS. 1 and 2.

Figure 6:
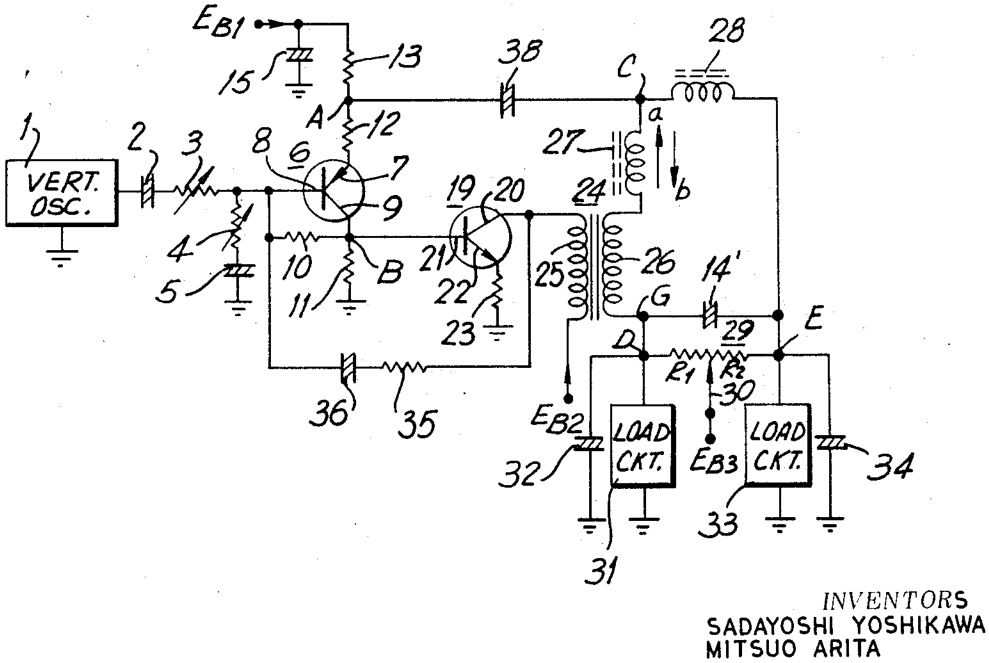
FIG. 6 shows still another embodiment.

FIG. 6 is a modification of the embodiment of FIG. 5. Specifically, capacitors 15 and 14' are used instead of capacitor 14. The first loop circuit of this embodiment has a capacitor 38 in addition to the elements of the circuit in FIG. 3.

In the embodiments of FIGS. 5 and 6, the load circuits may be replaced with a switchable load circuit unit as in the arrangement of FIG. 2 or 4.

In the television receivers using the circuit of this invention, it is necessary to adjust the position adjusting variable resistor so as not to cause DC current to flow in the vertical deflection coil if the picture tube used requires no correction in electron beam scanning.

In the circuit of this invention, current is supplied to the collector electrode 20 of vertical output transistor 19 from DC source $E_{B2}$ (for example, 100V) by way of the primary winding 25 of vertical output transformer 24, and the secondary winding 26 is isolated from the primary winding 25 in the DC sense. Picture position adjustment is effected by the use of a separately provided low voltage source $E_{B3}$ (for example, 20V). The power source $E_{B1}$ which is to supply current to the emitter electrode 7 of the driving transistor 6 is at the same potential or at a higher or lower potential which differs by a few volts in comparison with the power source $E_{B3}$. Thus, the vertical deflection current is fed back to the driver stage at a small potential difference. Accordingly, as illustrated in the foregoing embodiments, it is not generally necessary to use a DC blocking capacitor between junctions A and C or, if this capacitor is used, a peak voltage of about 2 to 3 volts will suffice for its purpose. This makes it possible to construct the device with a small size and to reduce the cost of the production. according to this invention, it is not necessary to use a bifilar winding for the secondary winding of the vertical output transformer for picture position adjustment as in vacuum-tube type color television receivers. Thus, by employing the circuits of this invention, the construction of color television receivers can be simplified and overall production cost can be reduced.

In short, the invention is characterized by the use of first and second loop circuits. The first loop circuit consists of a secondary winding of vertical output transformer, a vertical deflection coil, a feedback resistor of the driver stage, and at least one capacitor. The second loop circuit consists of said secondary winding, said vertical deflection coil, a choke coil, and a variable resistor. Either two load circuits are connected DC-wise to both terminals of the variable resistor of said second loop circuit, or one load circuit is connected selectively and switchably to said variable resistor. The brush of the variable resistor is connected to a DC source. In this arrangement, the vertical deflection current flows in said first loop circuit, and at the same time, this deflection current is fed back to the driver stage by said feedback resistor for the purpose of compensating linearity. When DC current is supplied to said load circuit through said second loop circuit, the value and direction of the DC current flowing in the vertical deflection coil are adjusted by said variable resistor whereby the picture position is adjusted. DC current is supplied to the vertical output element not from the output transistor DC source but from a separately provided power source by way of the primary winding of the vertical output transformer and said primary winding is isolated from said secondary winding.

Figure 7:
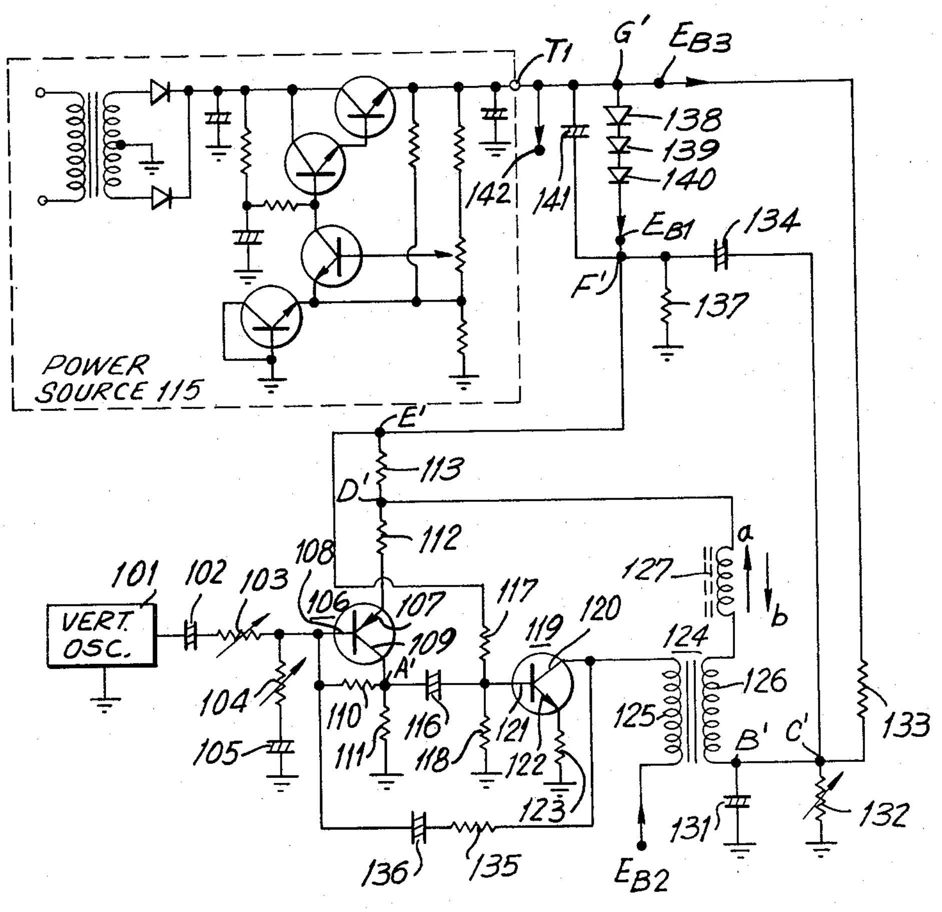
FIG. 7 is a schematic diagram showing another circuit in accordance with this invention.

Referring next to FIG. 7, section 101 is a known vertical oscillator circuit. Its output terminal is connected to the base electrode 108 of vertical driving transistor 106 by way of a series circuit comprising a coupling capacitor 102 and a variable resistor 103, which is used for vertical amplitude adjustment.

A linearity adjusting series circuit comprising a variable resistor 104 and a capacitor 105 is connected between the base electrode 108 and ground. The collector electrode 109 of transistor 106 is grounded via load resistor 111 and at the same time is connected to the base electrode 108 via biasing resistor 110. The collector electrode 109 of transistor 106 is also connected to the base electrode 121 of vertical output transistor 119 by way of the coupling capacitor 116.

The emitter electrode 107 of vertical driving transistor 106 is connected to a positive DC source $E_{B1}$ via a series circuit consisting of resistors 112 and 113. The base electrode 121 of vertical output transistor 119 is connected to the power source $E_{B1}$ through resistor 117 and is grounded via resistor 118 whereby a bias is applied to the transistor 119.

The emitter electrode 120 of transistor 119 is grounded via resistor 123, and its collector electrode 120 is connected to a positive DC source $E_{B3}$ via the primary winding of vertical output transformer 124. Thus, the collector electrode 120 receives DC current. The collector electrode 120 is also connected to the base electrode 108 of the driving transistor 106 via a series circuit comprising a resistor 135 and a capacitor 136 whereby there is formed a positive feedback circuit.

The upper terminal of the secondary winding 126 of the vertical output transformer 124 is connected to the junction D′ of the emitter resistors 112 and 113 of the driving transistor 106 via vertical deflection coil 127. The lower terminal of the secondary winding 126 is grounded through the bypass capacitor 131 and is also grounded through the bleeder variable resistor 132.

The lower terminal of the secondary winding 126 is connected to the positive DC source $E_{B3}$ through voltage dropping resistor 133 and is also connected to the power source $E_{B1}$ through the capacitor 134 which is adapted to pass the deflection current. The junction of power source $E_{B1}$ and capacitor 134 is grounded through bleeder resistor 137.

The power circuit source 115 is a known circuit associating rectifier and stabilizer circuits. The output terminal T1 is used as the power source $E_{B3}$ and is also used as the power source $E_{B1}$ after passing through a series of diodes 138, 139 and 140. A capacitor 141 for bypassing the vertical deflection current is connected in parallel with the said series diodes. The terminal 142 is a power supply terminal used for other circuits. The voltage of power source $E_{B1}$ is lower than that of $E_{B3}$ by about two volts owing to diodes 138, 139 and 140.

The operation of the vertical deflection circuit of FIG. 7 will next be explained below. A 60Hz sawtooth wave generated by the oscillator circuit 101 is supplied to the base electrode 108 of the driving transistor 106 via the coupling capacitor 102 and amplitude adjusting variable resistor 103. In this operation, the integrator circuit consisting of variable resistor 104 and capacitor 105 (which integrator circuit is included in the base circuit) is operated to adjust the linearity of the upper portion on the screen.

The output of the driving transistor 106 is taken from junction A′ of the collector load resistor 111 and is supplied to the base electrode 121 of vertical output transistor 119 via capacitor 116. The emitter electrode 122 of vertical output transistor 119 is provided with a resistor 123 for compensating linearity. The sawtooth wave appearing at the collector electrode 120 of the vertical output transistor 119 is positively fed back to the base electrode 108 of the driving transistor 106 by the resistor 135 and capacitor 136 whereby linearity is further compensated.

At the same time, said sawtooth wave is supplied to the primary winding 125 of vertical output transformer 124. The deflection current appearing in the secondary winding 126 flows through the vertical deflection coil 127, resistor 113 and capacitor 134. During this operation, the deflection signal is fed back to the emitter of driving transistor 106 as follows. When the deflection current flows through the resistor 113, an AC voltage across the resistor 113 appears at the junction A and is fed to the emitter electrode 107 by resistor 112 whereby linearity is further compensated.

The capacitors 131 and 141 are used to bypass part of the deflection current. Theoretically it is not necessary to provide these capacitors but as a practical matter these capacitors serve to prevent the linearity from being disturbed.

The operation of the picture position adjusting circuit will next be explained. The position adjustment is determined by comparing two potentials: the potential at junction D′ determined by the power source $E_{B1}$ and the potential at junction C′ determined by the power source $E_{B3}$. When the potential at junction C′ is made higher than that at junction D′ by the use of variable resistor 132, a DC current flows in the vertical deflection coil in the direction of arrow *a* and thence to the ground through the emitter feedback resistor 113 and resistor 137. The DC current is superimposed on the vertical deflection current, and the electron beam in the picture tube is shifted in one direction. As a result, the picture is shifted in entirety in one vertical direction.

When the potential at junction C′ is lowered to a magnitude below that at junction D′ by use of the variable resistor 132, a DC current flows in the vertical deflection coil 127 in the direction of arrow *b* and then to ground via variable resistor 132. This DC current is superimposed on the vertical deflection current and the electron beam is shifted in the reverse direction. As a result, the picture is shifted in entirety in the reverse direction.

In a television receiver in which the electron beam scanning requires no correction, it is necessary to adjust the variable resistor 132 so that the potential at junction C' is equal to that at junction D' whereby the picture will remain in its desired position on the screen.

In the embodiment of FIG. 7, the power source $E_{B3}$ is at a potential which is higher by about two volts than that at $E_{B1}$. The purpose of this arrangement is to make it possible to change the DC current flowing in the vertical deflection coil 127 in either direction. If the potential of power source at $E_{B1}$ is equal to or higher than that at $E_{B3}$, the potential at C' is always lower than that at D', and the DC current can flow through the vertical deflection coil only in the direction of arrow *b*. In other words, even if the variable resistor 132 is adjusted under the assumed circumstances, only the value of the DC current can be changed and the picture can therefore be shifted in only one direction.

In the embodiment of FIG. 7, the power supply at $E_{B1}$ is derived from the power source $E_{B3}$ via the serially connected diodes 138, 139 and 140. Thus, two different potentials are derived from one simple power circuit. In this arrangement, the voltage of $E_{B3}$ is 20 volts, for example, and the forward voltage drop of the diodes 138, 139 and 140 is utilized. Accordingly, the power source $E_{B1}$ is at 18 volts as the voltage drop per diode is about 0.7 volt (e.g., a total of about 2 volts).

The voltage ratio between the power sources $E_{B3}$ and $E_{B1}$ is kept constant by the diodes 138, 139 and 140. Therefore, the picture position after adjustment is not shifted by reason of voltage variation. In short, the serially connected diodes 138, 139 and 140 serve to provide a means for deriving two different potentials from one power circuit and a means for stabilizing the voltage ratio between the two power sources.

According to this invention, it is not necessary to use a conventional DC blocking capacitor of high peak voltage rating in order to feed back the vertical deflection current to the driver stage. Instead, the capacitors used for the purpose of this invention may be of low peak voltage rating. This permits a reduction in the constructional size of the circuit as well as in production cost.

Figure 8:
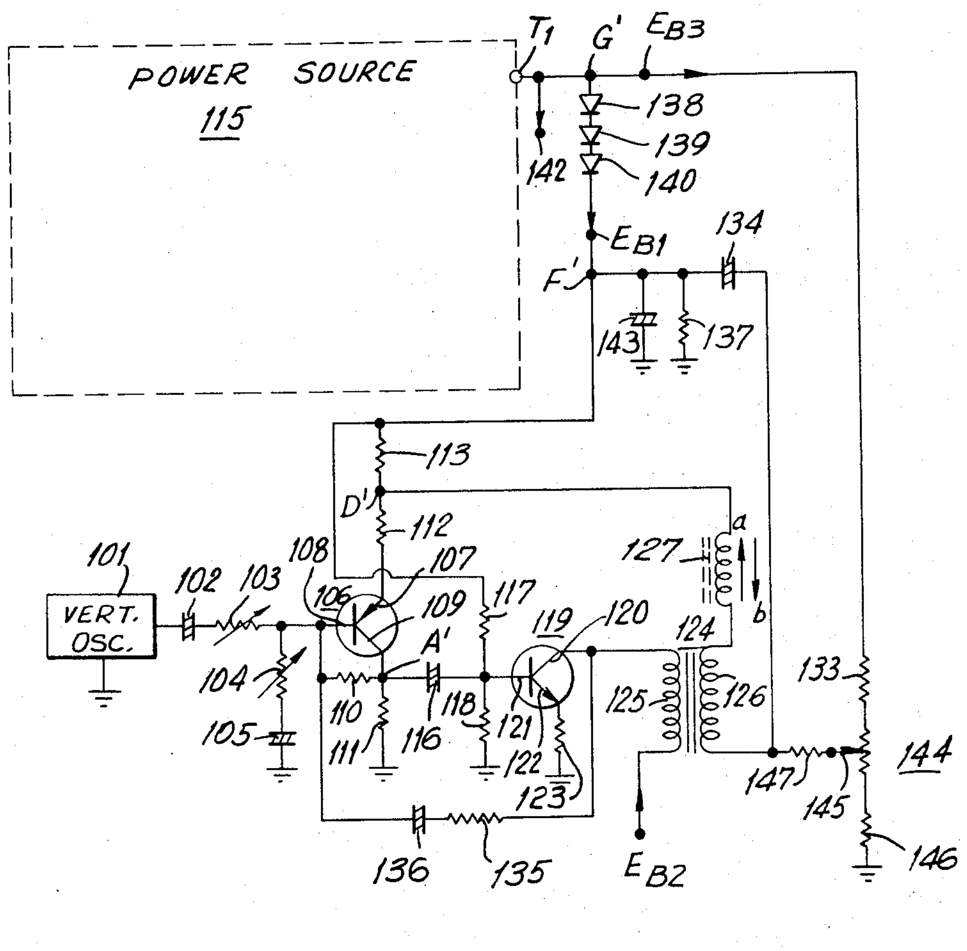
FIGS. 8 and 9 are schematic diagrams of other circuits in accordance with further embodiments of the invention.

FIG. 8 shows another embodiment of the invention. This embodiment is a modification of the embodiment of FIG. 7. Referring to FIG. 8, a variable bleeder resistor 144 is used for changing the potential at junction C'. A resistor 146 for determining the lower limit of the variable range of the potential at junction C' is connected between the variable resistor 144 and ground. A resistor 147 for blocking the vertical deflection current is connected between the brush 145 and junction C'. A capacitor 143 having the same function as capacitor 141 of FIG. 7 is connected in parallel to the bleeder resistor 137. This circuit is operated in the same manner as in the arrangement shown in FIG. 7.

Figure 9:
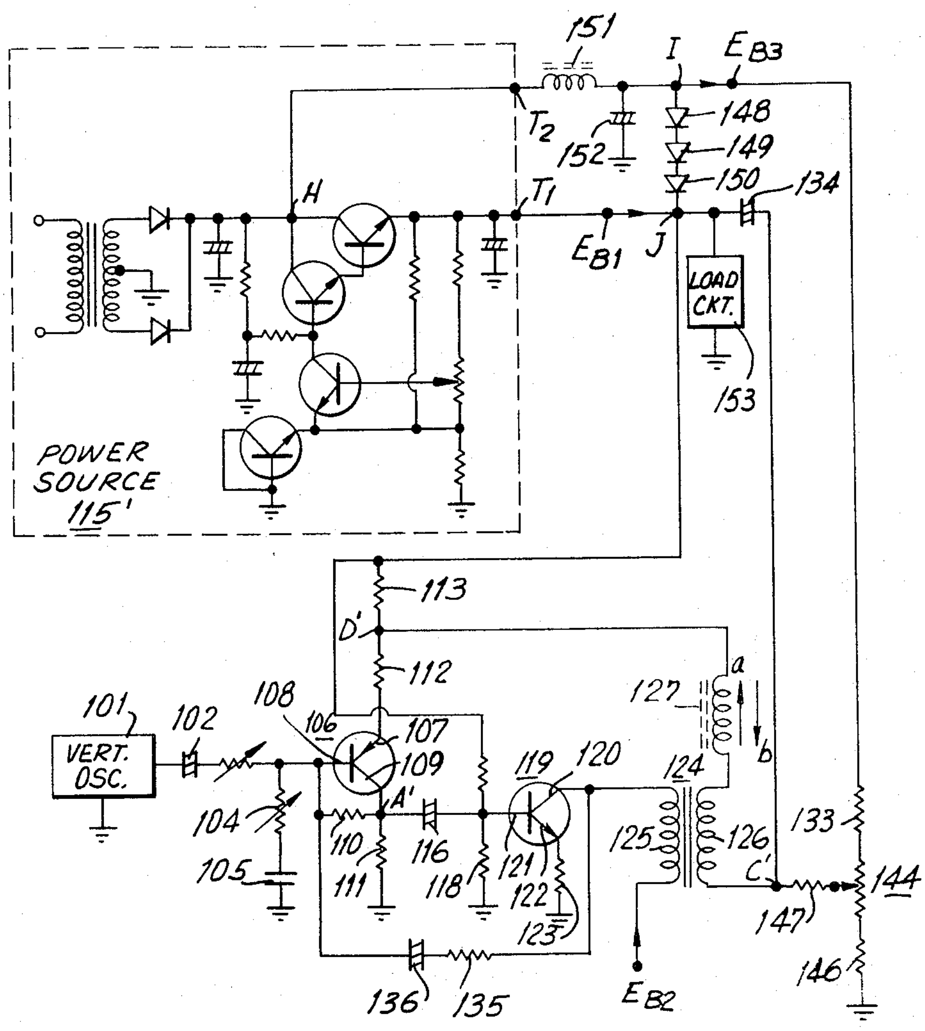

FIG. 9 shows a modification of the embodiment of FIG. 8. In this embodiment, the terminal T1 of power supply circuit 115' is used as power source $E_{B1}$. The voltage at terminal T2 is brought from terminal H of the filter of power supply circuit 115' and is used as power source $E_{B3}$ after being smoothed by a smoother circuit comprising a choke coil 151 and a capacitor 152. The power source $E_{B3}$ has a potential which is higher than $E_{B1}$ by about 2 volts. Serial diodes 148, 149 and 150 are connected between the power sources $E_{B3}$ and $E_{B1}$ and form a stabilizer circuit for keeping the voltage ratio between the two power sources constant.

A load circuit 153 is connected between the power source $E_{B1}$ and ground. This circuit is operated as a bleeder resistor as was also shown in FIG. 8. The circuit 153 serves as a circuit which, for example, may be used for supplying DC power to circuits connected with the picture tube. This circuit is operated in the same manner as in the arrangements shown in FIGS. 7 and 8.

In the circuit of this invention, current is supplied to the collector electrode 120 of vertical output transistor 119 from the DC source $E_{B2}$ (for example, 100V) by way of the primary winding 125 of the vertical output transformer 124. The secondary winding 126 is isolated from the primary winding 125 in the DC sense. The picture position adjustment is effected by the use of separately provided low voltage source $E_{B3}$ (for example, about 20V) and $E_{B1}$ (for example, about 18V). The power source $E_{B1}$ is used to supply current to the emitter electrode 107 of driver transistor 106. As illustrated in the foregoing embodiments of FIGS. 7–9, it is not necessary to use a DC blocking capacitor between the vertical deflection coil and driver stage since the vertical deflection current is fed back to the driver stage at a small potential difference. This serves to reduce the cost of manufacture.

According to this invention, it is also not necessary to use a bifilar winding as the secondary winding of the vertical output transformer for the purpose of picture position adjustment as in known vacuum-tube type color television receivers. Thus, by employing the improvements of this invention, the construction of color television receivers can be remarkably simplified and overall production costs can be reduced.

As has been described above, the arrangement of this invention is such that DC current is supplied to the vertical output element from an independently provided first DC source, the primary winding and secondary winding of the vertical output transformer are isolated from each other in the DC sense, and DC current is supplied to the vertical driver stage from a second DC source via a feedback resistor. An AC loop circuit is formed by said feedback resistor, a capacitor and a series circuit comprising said secondary winding and vertical deflection coil. The vertical deflection current flows and current feedback to the driver stage is effected through said feedback resistor. One terminal of said series circuit is connected to the second DC source by way of said feedback resistor and circuit for shunting the DC current. The other terminal of said series circuit is connected via a DC current shunting, variable resistor to a third DC source whose potential is a little higher than that of said second DC source. The potential difference across the terminals of said series circuit is varied by said variable resistor whereby the value and direction of the DC current flowing in the vertical deflection coil is determined for selecting correct picture position on the screen.

The invention proposes an arrangement in which a number of unidirectional conductive elements such as semiconductor diodes or Zener diodes or the like is connected in series to form a stabilizer circuit so that the voltage ratio between the two power sources is kept constant. Also, the invention proposes an arrangement in which said second DC source is derived from the third DC source through a number of serially connected unidirectional conductive elements and, with these elements, a stabilizer circuit is formed whereby the voltage ratio between the two DC sources is kept constant.

What is claimed is:

1. Deflection and picture-position adjusting apparatus for use with a picture tube in a television receiver and comprising:

transistor means for generating a sawtooth wave relating to a deflection signal, said means including driver and output stages connected together to generate said sawtooth wave;

a transformer including a primary winding connected to said output stage and a secondary winding inductively coupled with said primary winding and isolated therefrom with respect to DC voltage;

deflection coil means coupled to said secondary winding in series and positioned in operative association with said tube to apply a deflection signal to the picture tube;

a resistor forming a series circuit with at least said secondary winding and deflection coil means and connected in feedback relationship with said driving stage for linearity compensation;

control means including a variable resistor coupled to one end of said series circuit for controlling the magnitude of direct current and the direction of the same through said deflection coil means to enable adjusting the position of a picture on said tube;

at least one load coupled to said series circuit;

a first DC source coupled to at least said one end of the series circuit via said control means;

a second DC source coupled to said output stage;

and a third DC source coupled to another end of said series circuit and connected via said resistor to the driver stage.

2. Apparatus as claimed in claim 1 wherein said variable resistor includes resistance means and a brush dividing said resistance means into two sections.

3. Apparatus as claimed in claim 2 wherein said brush is connected to said first DC source and said resistance means has opposite terminals, one of which is connected to said one end of the series circuit, said apparatus further comprising: coil means having a high impedance with respect to the deflection frequency and connected to form a loop in series together with said resistance means, secondary winding and deflection coil means for the flow of DC current.

4. Apparatus as claimed in claim 3 wherein said load is connected to said one terminal of the resistance means, said apparatus further comprising a bypass capacitor connected across said series circuit for bypassing said coil means and resistance means; and another load connected to another terminal of said resistance means, said first DC source passing DC current into said loads through said loop.

5. Apparatus as claimed in claim 4 comprising: other bypass capacitors respectively connected to said terminals of the resistance means for respectively bypassing said loads.

6. Apparatus as claimed in claim 4 wherein said first DC source is at a potential which is greater than the potential of said third DC source and said loop is connected directly to said resistor.

7. Apparatus as claimed in claim 4 comprising: a blocking capacitor of a low peak rating included in said series circuit and connecting said loop to said resistor whereby each of said first and third DC sources are isolated, with respect to DC sense from one another.

8. Apparatus as claimed in claim 3 wherein said load is connected to said one terminal of the resistance means, said apparatus further comprising: a first bypass capacitor connected across said resistance means; a second bypass capacitor connected between said third DC source and ground; another load connected to another terminal of said resistance means; and third and fourth bypass capacitors respectively connected to said terminals of the resistance means for respectively bypassing said loads.

9. Apparatus as claimed in claim 8 wherein said first DC source is at a potential which is greater than the potential of said third DC source and said loop is connected directly to said resistor.

10. Apparatus as claimed in claim 8 comprising a blocking capacitor of low peak rating connecting said loop to said resistor whereby each of said first and third DC sources is isolated, with respect to DC voltage, from one another.

11. Apparatus as claimed in claim 3 comprising a switch selectively connecting said load to each of said terminals of the resistance means.

12. Apparatus as claimed in claim 11 comprising a bypass capacitor selectively connected to each of said terminals together with said load by said switch.

13. Apparatus as claimed in claim 11 wherein said switch is interlocked with said variable resistor.

14. Apparatus as claimed in claim 12 wherein said switch is interlocked with said variable resistor.

15. Apparatus as claimed in claim 11 comprising a bypass capacitor connected across said series circuit for bypassing said coil means and resistance means.

16. Apparatus as claimed in claim 15 wherein said first DC source is at a potential which is greater than the potential of said third DC source and said loop is connected directly to said resistor.

17. Apparatus as claimed in claim 15 comprising a blocking capacitor of low peak rating connecting said loop to said resistor whereby each of said first and third DC sources is isolated, with respect to DC voltage from one another.

18. Apparatus as claimed in claim 11 comprising a bypass capacitor connected between said third DC source and ground; and another bypass capacitor connected in parallel across said resistance means.

19. Apparatus as claimed in claim 18 wherein said first DC source is at a potential which is greater than the potential of said third DC source, and said loop is connected directly to said resistor.

20. Apparatus as claimed in claim 18 comprising a blocking capacitor of low peak rating connecting said loop to said resistor whereby said first and third DC sources are isolated from one another.

* * * * *